(12) United States Patent
Morrison (10) Patent No.: US 10,644,742 B2
(45) Date of Patent: May 5, 2020

(54) NON-DUPLEXER ARCHITECTURES FOR TELECOMMUNICATIONS SYSTEM

(71) Applicant: Andrew Wireless Systems GmbH, Buchdorf (DE)

(72) Inventor: Charles B. Morrison, Forest, VA (US)

(73) Assignee: Andrew Wireless Systems GmbH, Buchdorf (DE)

( * ) Notice: Subject to any disclaimer, the term of this patent is extended or adjusted under 35 U.S.C. 154(b) by 177 days.

(21) Appl. No.: 15/579,181

(22) PCT Filed: Sep. 25, 2015

(86) PCT No.: PCT/IB2015/057404
§ 371 (c)(1),
(2) Date: Dec. 1, 2017

(87) PCT Pub. No.: WO2016/178067
PCT Pub. Date: Nov. 10, 2016

(65) Prior Publication Data
US 2018/0191397 A1 Jul. 5, 2018

Related U.S. Application Data

(60) Provisional application No. 62/155,585, filed on May 1, 2015.

(51) Int. Cl.
*H04B 1/44* (2006.01)
*H04B 15/02* (2006.01)
(Continued)

(52) U.S. Cl.
CPC ............ *H04B 1/48* (2013.01); *H04B 1/001* (2013.01); *H04B 1/52* (2013.01); *H04L 5/14* (2013.01)

(58) Field of Classification Search
None
See application file for complete search history.

(56) References Cited

U.S. PATENT DOCUMENTS 6,697,603 B1 * 2/2004 Lovinggood ...... H04B 7/15528
370/315
8,457,021 B2 * 6/2013 Schiff ................ H04B 7/15585
370/279
(Continued)

FOREIGN PATENT DOCUMENTS

CN 101207403 A 6/2008
CN 102082578 A 6/2011
(Continued)

OTHER PUBLICATIONS

European Patent Office, "Communication pursuant to Article 94(3) from EP Application No. 157780495 dated Aug. 1, 2019", from Foreign Counterpart to U.S. Appl. No. 15/579,181, pp. 1-4, Published: EP.

(Continued)

*Primary Examiner* — Tuan A Tran (57) ABSTRACT

A telecommunications system can include analog-to-digital converters in an uplink communication path or a downlink communication path. The analog-to-digital converters can have a high dynamic range and bandwidth to obviate a need for down-conversion of signals using an analog mixer. The uplink communication path and the downlink communication path can be coupled to an antenna using a non-duplexer coupling device. Uplink signals traversing the uplink communication path can be isolated from downlink signals independent of using a duplexer.

14 Claims, 8 Drawing Sheets

(51) Int. Cl.
- *H04B 1/48* (2006.01)
- *H04B 1/00* (2006.01)
- *H04B 1/52* (2015.01)
- *H04L 5/14* (2006.01)

(56) References Cited

U.S. PATENT DOCUMENTS

| | | | | |
|---|---|---|---|---|
| 8,638,835 | B2* | 1/2014 | Wang | H04B 7/15578 375/211 |
| 8,818,299 | B2* | 8/2014 | Morrison | H04B 1/525 455/78 |
| 8,937,874 | B2* | 1/2015 | Gainey | H04B 7/15578 370/252 |
| 8,976,067 | B2 | 3/2015 | Fischer | |
| 9,614,629 | B2* | 4/2017 | Braz | H04J 1/08 |
| 9,705,609 | B2* | 7/2017 | Ranson | H04W 88/085 |
| 9,748,906 | B2 | 8/2017 | Stewart et al. | |
| 10,009,120 | B2* | 6/2018 | Ranson | H04W 88/085 |
| 2012/0313821 | A1 | 12/2012 | Fischer | |
| 2012/0329523 | A1 | 12/2012 | Stewart et al. | |
| 2013/0077502 | A1* | 3/2013 | Gainey | H04B 7/15578 370/252 |
| 2014/0050212 | A1* | 2/2014 | Braz | H04J 1/08 370/343 |
| 2015/0296527 | A1* | 10/2015 | Ranson | H04W 88/085 370/329 |

FOREIGN PATENT DOCUMENTS

| | | |
|---|---|---|
| CN | 103650358 A | 3/2014 |
| WO | 03081796 | 10/2003 |
| WO | 2012166961 | 12/2012 |

OTHER PUBLICATIONS

State Intellectual Property Office, "First Office Action from CN Application No. 201580081346.1 dated Jun. 13, 2019", from Foreign Counterpart to U.S. Appl. No. 15/579,181, pp. 122, Published: CN.

International Searching Authority, "International Search Report for PCT Application No. PCT/IB2015/057404 filed Sep. 25, 2015", "Foreign Counterpart to U.S. Appl. No. 15/579,181", , pp. 1-16 (missing PCT/ISA/220: No Mail date), Published in: WO.

* cited by examiner

NON-DUPLEXER ARCHITECTURES FOR TELECOMMUNICATIONS SYSTEM

CROSS-REFERENCE TO RELATED APPLICATION

This application is a 371 National Stage Application of PCT Application No. PCT/IB2015/057404, filed on Sep. 25, 2015 and titled "NON-DUPLEXER ARCHITECTURES FOR TELECOMMUNICATIONS SYSTEM", which claims priority to U.S. Provisional Application Ser. No. 62/155,585, filed May 1, 2015 and titled "Distributed Antenna System with Non-Duplexer Isolator Subsystem," the contents of both of which are incorporated herein by reference in their entirety.

TECHNICAL FIELD

The present disclosure relates generally to telecommunications and more particularly (although not necessarily exclusively) to isolating an uplink communication path from a downlink communication path in a distributed antenna system without the use of a duplexer.

BACKGROUND

A telecommunications system can include a distributed antenna system ("DAS") or a repeater that can be used to extend the coverage of a cellular communication system. For example, a DAS can extend coverage to areas of traditionally low signal coverage within buildings, tunnels, or in areas obstructed by terrain features. A DAS can include one or more master units in communication with carrier systems, such as base transceiver stations of cellular service providers. The DAS can also include remote units physically separated from the master unit, but in communication with the master unit via a serial link that may be copper, optical, or other suitable communication medium.

The remote units can wirelessly communicate with user devices positioned in a coverage area. For example, the remote units can be positioned in a building, tunnel, or other structure that prevents or limits communications directly with the carriers. Remote units amplify downlink signals received from the base station via a master unit and radiate the downlink signal using an antenna. An antenna unit recovers uplink signals from mobile user equipment and provides the uplink signals to the master unit. The uplink signals can be summed together and provided back to the base station.

A remote unit can include at least one duplexer. The duplexer can isolate a transmitter output from a receiver input by allowing frequencies within the downlink band to be provided from the transmitter output to the antenna and allowing frequencies within the uplink band to be provided from the antenna output to the receiver. But, duplexers can provide little or no flexibility to respond to changes in frequency band allocation.

SUMMARY

According to one aspect of the present disclosure, a telecommunications system can include an uplink communication path and a downlink communication path coupled to an antenna. Analog-to-digital converters can be positioned in the uplink communication path and the downlink communication path. The analog-to-digital converters can have a dynamic range and bandwidth for sampling a signal prior to down-converting the signal. The telecommunication system can isolate uplink signals traversing the uplink communication path from downlink signals traversing the downlink communication path without using a duplexer.

According to another aspect of the present disclosure, a telecommunications system can include a master unit and a remote unit. The master unit can include an analog-to-digital converter having a dynamic range and bandwidth for sampling downlink signals prior to down-converting the downlink signals. The remote unit can include an uplink communication path and a downlink communication path coupled to an antenna. The remote unit can isolate uplink signals traversing the uplink communication path from the downlink signals traversing the downlink communication path without using a duplexer.

According to another aspect of the present disclosure, a method can include coupling an antenna to an uplink communication path and a downlink communication path using a power combiner. The method may also include converting downlink signals traversing the downlink communication path from analog signals to digital signals using an analog-to-digital converter. The analog-to-digital converter may have a dynamic range and bandwidth for sampling the analog signals prior to down-converting, using an analog mixer, the analog signals. The method can also include isolating uplink signals traversing the uplink communication path from the downlink signals without using a duplexer.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Certain aspects and features are directed to a telecommunications system for isolating uplink signals traversing an uplink communication path in the system from downlink signals using high dynamic range analog-to-digital converters in an active mitigation subsystem, obviating the need for a duplexer in the DAS. The analog-to-digital converters can have a very high dynamic range and bandwidth to allow for converting analog signals to digital signals without prior down-conversion of the analog signals. The use of these analog-to-digital converters in the telecommunications system can reduce or eliminate the need for the down-conversion of signals using an analog mixer. Down-conversion using an analog mixer can often be a major source of spurious responses necessitating strict isolation requirements in some DAS architectures. Reducing or eliminating some of the strict requirements for isolation of the uplink signals from the downlink signals can allow for a coupling device having little inherent isolation properties (e.g., a power combiner) to be used for coupling the uplink communication path to a downlink communication path. The uplink communication path and the downlink communication path may be coupled to an antenna.

Figure 1:
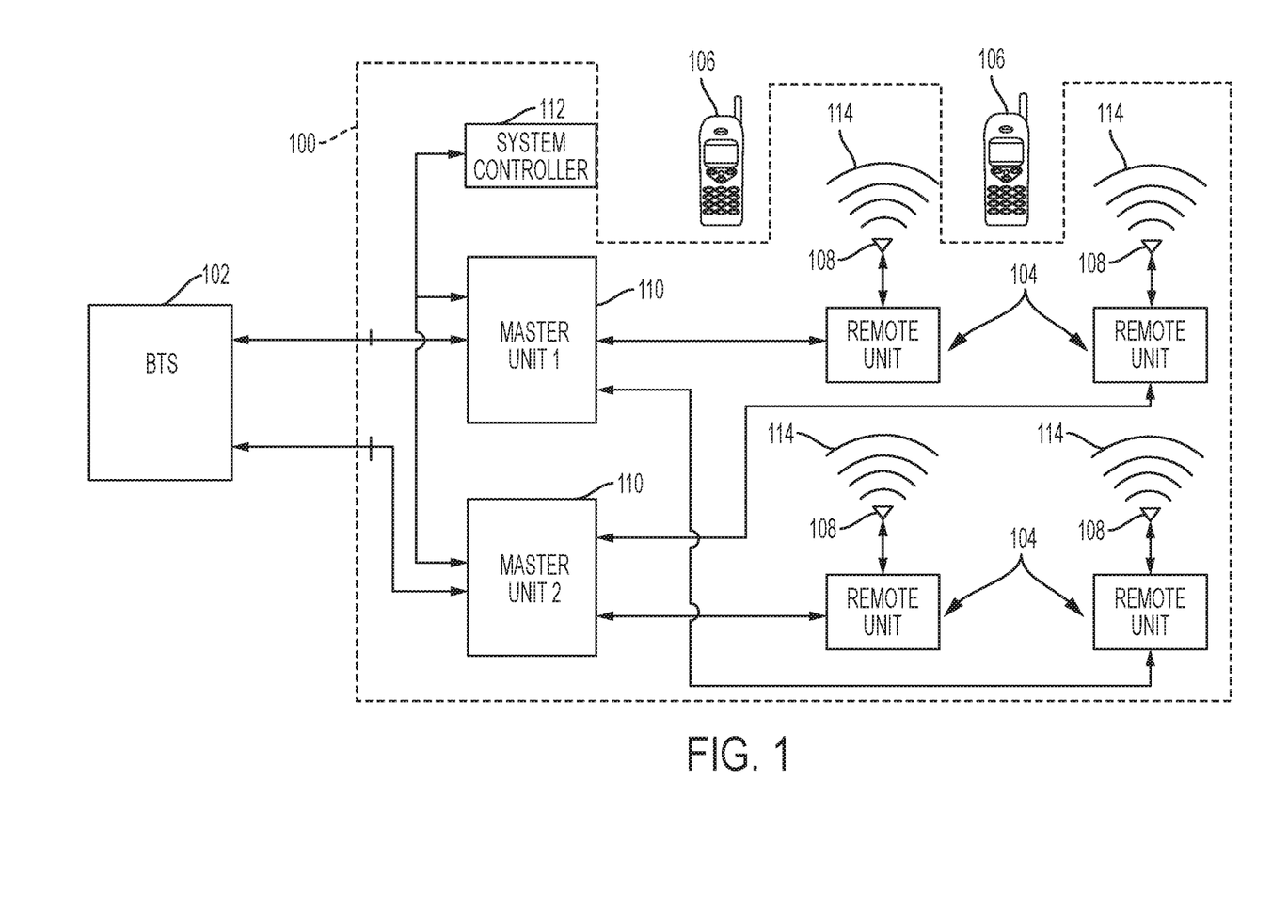
FIG. 1 is a block diagram of an example of an environment for a telecommunications system for isolating uplink signals from downlink signals without using a duplexer according to one aspect.

FIG. 1 schematically depicts a DAS 100 that can include a system for isolating uplink signals from downlink signals without using a duplexer according to an aspect of the present disclosure. The DAS 100 can be communicatively coupled to at least one base station 102 via a wired or wireless communication medium. The DAS 100 can be positioned in an area such as a building environment to extend wireless communication coverage. The DAS 100 can include one or more remote units 104 that are distributed in the environment to provide coverage within a service area of the DAS 100. The remote units 104 can service a number of different user devices 106, such as cellular phones, operating in the environment of the DAS 100. Each remote unit 104 can include at least one antenna 108. Antenna 108 may be a common antenna or can include one or more antenna elements.

Remote units 104 can be communicatively coupled to one or more master units 110 via any communication medium capable of carrying signals between the master unit 110 and remote unit 104. Examples of suitable communication mediums include copper, optical, and microwave link. Master units 110 can process the signals from remote units 104 to interface appropriately with the base station 102. A system controller 112 can control the operation of each of the master units 110 for processing the signals 114 associated with the remote units 104. The signals 114 of the remote units 104 can be the uplink and downlink signals of the DAS 100 for communicating with user devices 106.

Figure 2:
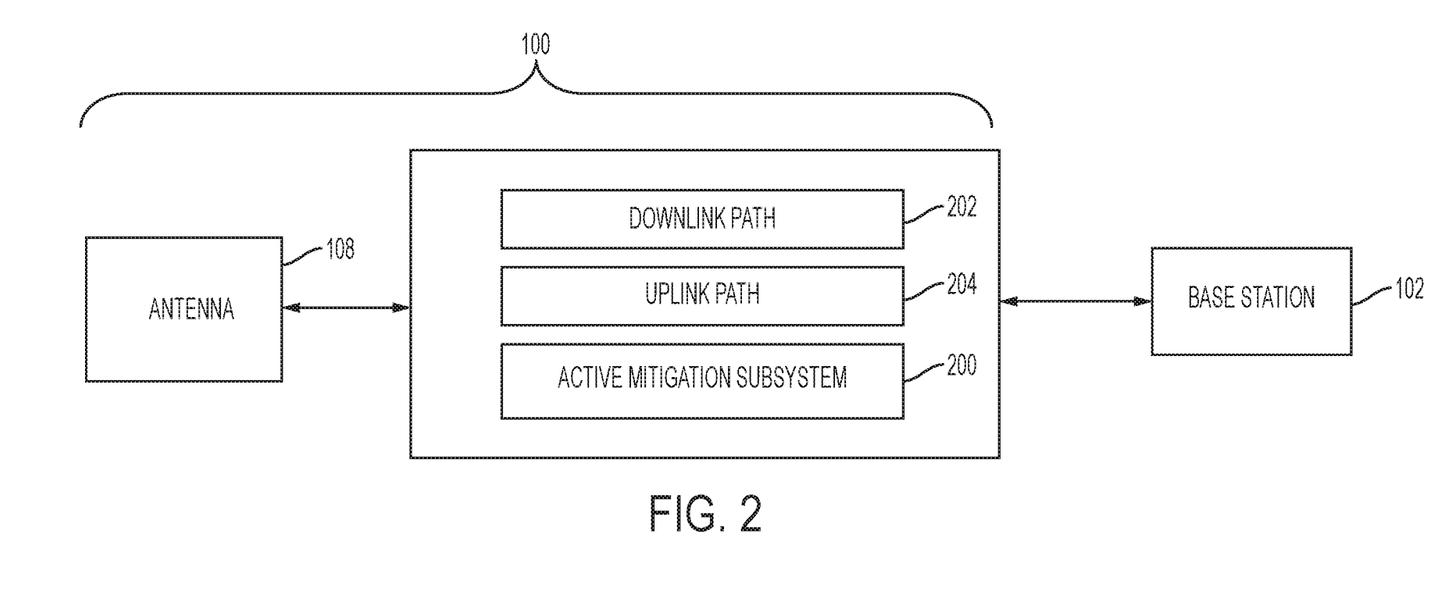
FIG. 2 is a block diagram of a system for isolating uplink signals from downlink signals without using a duplexer that can be disposed in the telecommunications system of FIG. 1 according to one aspect.

Although DAS 100 is depicted as including two master units 110 and four remote units 104, any number (including one) of each of master units 110 and remote units 104 can be used. Furthermore, a DAS 100, according to some aspects, can be implemented without system controller 112. The present disclosure can be included in one or more of the remote units FIG. 2 depicts a telecommunications system in DAS 100 including an active mitigation subsystem 200, a downlink communication path 202, and an uplink communication path 204. Circuitry included in the active mitigation subsystem 200 can be included in the downlink communication path 202 and the uplink communication path 204 and can isolate signals traversing the uplink communication path 204 from signals or other signal components of the downlink communication path 202. Downlink communication path 202 and uplink communication path 204 can be communicatively coupled to antenna 108. In some aspects, downlink communication path 202 and uplink communication path 204 can be directly coupled to antenna 108 by a device having little inherent isolation (e.g., a power combiner). Antenna 108 can include one antenna that can both transmit and receive RF signals.

In some aspects, active mitigation subsystem 200 can be disposed in a remote unit 104. In other aspects, active mitigation subsystem 200 can be disposed in a master unit 110. The active mitigation subsystem 200 can alternatively be disposed throughout various components of the DAS 100 (e.g., partially within a master unit 110 and partially within a remote unit 104).

The circuitry included in the active mitigation subsystem 200 according to various aspects can incorporate components that prevent the formation of a feedback loop. These components can attenuate the gain of both uplink and downlink signal to prevent system instability in DAS 100.

Figure 3:
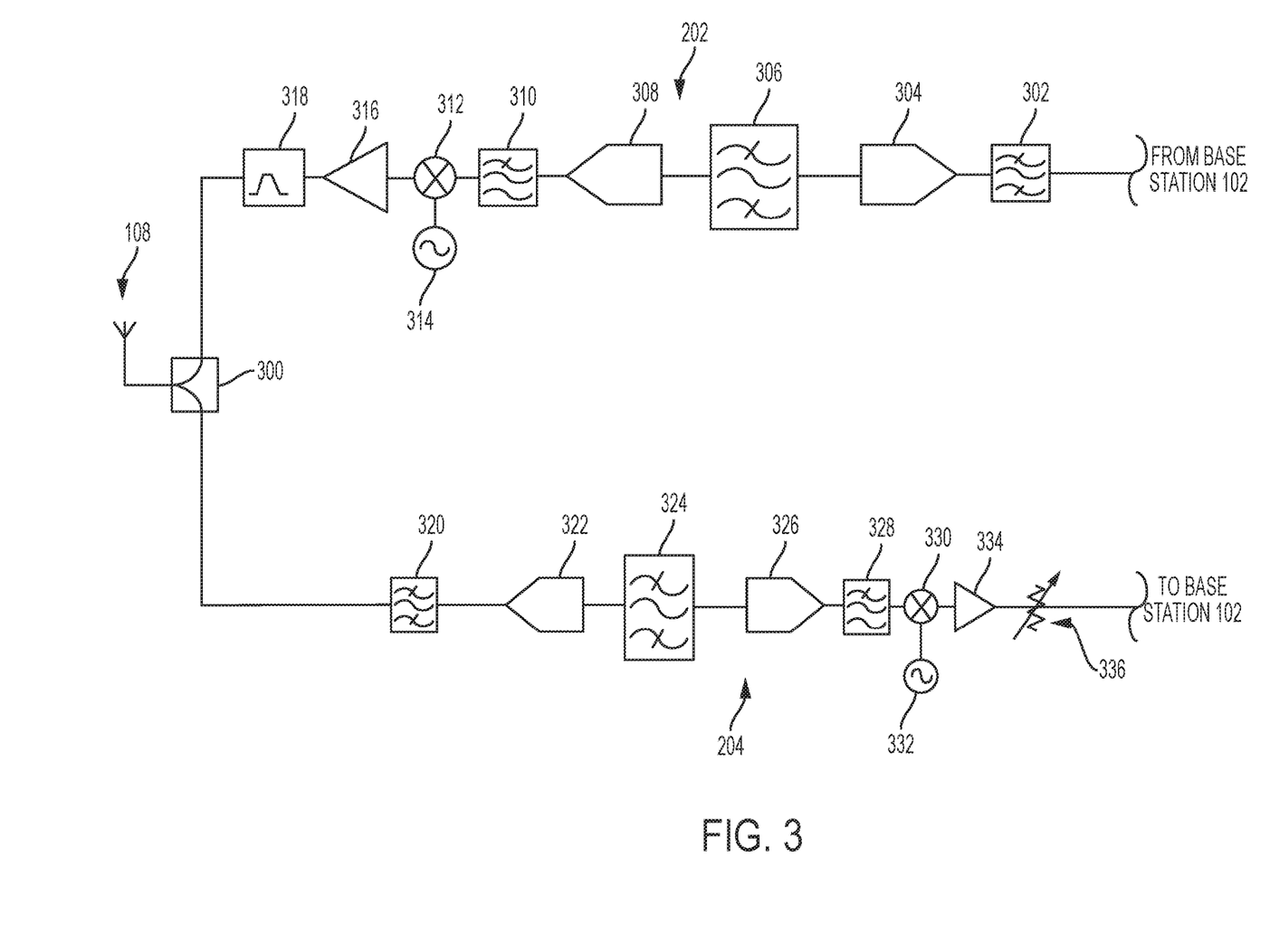
FIG. 3 is a schematic view of a system that includes a power combiner for coupling an antenna to a downlink communication path and an uplink communication path according to one aspect.

FIG. 3 schematically depicts circuitry for an active mitigation subsystem 200 with the downlink communication path 202 and uplink communication path 204 coupled to antenna 108 by a power combiner 300. Antenna 108 can radiate downlink signals traversing downlink communication path 202 to user devices 106. Antenna 108 can also recover uplink signals from user devices 106 and can provide the uplink signals to the uplink communication path 204. Signals traversing uplink communication path 204 can be provided to base station 102.

The active mitigation subsystem 200 can include anti-aliasing filter 302, analog-to-digital converter 304, digital IF filter 306, digital-to-analog converter 308, analog filter 310, mixer 312, local oscillator 314, power amplifier 316, and electronically tuned filter 318 in the downlink communication path 202. Anti-aliasing filter 302 can reduce aliasing from converting the downlink signal from analog to digital. For example, anti-aliasing filter 302 can restrict signal bandwidths to one Nyquist zone, rejecting frequencies occupying bandwidths greater than one-half the sampling frequency of analog-to-digital converter 304. Anti-aliasing filter 302 can also reject signal components in one or more adjacent Nyquist zones. In some aspects, anti-aliasing filter 302 can include a surface acoustic wave ("SAW") filter. Analog-to-digital converter 304 can convert the analog downlink signal to a digital downlink signal, such as for transmission via a serial link between a master unit, which includes the analog-to-digital converter 304, and a remote unit. In some aspects, analog-to-digital converter 304 can be a very high dynamic range analog-to-digital converter. Analog-to-digital converter 304 can include a sample rate and input bandwidth sufficient to directly sample incoming RF signals from base station 102. For example, an analog-to-digital converter with an input bandwidth greater than 1 GHz and sample rate greater than 2 GHz would be sufficient to directly sample all frequencies up to 1 GHz. Use of a very high dynamic range analog-to-digital converter bypasses the need for down-conversion of a downlink signal in downlink communication path 202 prior to analog-to-digital converter 304 converting the downlink signal to a digital downlink signal.

Digital IF filter 306 can receive the digital downlink signal and reduce the bandwidth of the downlink digital signal. Digital-to-analog converter 308 can convert the downlink signal to an analog signal. Analog filter 310 can receive the analog downlink signal and remove any aliases resulting from converting the digital signals to analog. Mixer 312 and local oscillator 314 can up-convert the downlink signal to the appropriate RF frequency. Power amplifier 316 can amplify the downlink signal to the output power for transmission.

Prior to antenna 108 broadcasting the downlink signal, electronically tuned filter 318 can attenuate any undesirable signals generated in the transmitter. Attenuation of undesirable signals can prevent desensitization of a receiver from transmitted noise falling in the receive frequency band of antenna 108. Attenuation of undesirable signals can also prevent spurious signals generated in a transmitter at receive frequency bands from entering the receiver. Undesirable signal components can be generated by components of downlink communication path 202 while processing the downlink signal, or otherwise. Undesirable signal components can include signals, other than the desired downlink signal, transmitted by transmit antenna 108 at a frequency within the receive frequency band of antenna 108. Undesirable signal components can also include harmonics of the transmit RF frequency of downlink signals. Undesirable signal components can also include signals generated by mixer 312 and local oscillator 314 during up-conversion to RF. For example, during up-conversion, mixer 312 can process the IF downlink signal and a signal received from local oscillator 314. The output signal of mixer 312 can include two signals. One signal may be the RF downlink signal at a frequency equal to the sum of the frequencies of the IF downlink signal and the signal received from local oscillator 314. The other signal can be an image signal at a frequency equal to the difference of the frequencies of the IF downlink signal and the signal received from local oscillator 314. The image signal, as well as any harmonics of the output signals of mixer 312, may be undesirable signal components.

In some aspects, some components positioned in the downlink communication path 202 can be disposed in master unit and other components can be disposed within a remote unit. The components disposed in a master unit can include anti-aliasing filter 302 and analog-to-digital converter 304. The components disposed within a remote unit can include digital IF filter 306, digital-to-analog converter 308, analog filter 310, mixer 312, local oscillator 314, power amplifier 316, and electronically tuned filter 318. In these aspects, the output of analog-to-digital converter 304 is coupled to the input of digital IF filter 306 via a serial communications link. In other aspects, all components of downlink communication path 202 can be disposed in a master unit or in a remote unit. Although FIG. 3 depicts the downlink communication path 202 receiving signals directly from the base station 102, a downlink communication path 202 can receive signals from a base station 102 via one or more intermediate components or devices. For example, the downlink communication path 202 can receive signals from a base station 102 via a master unit when all of the components of a downlink communication path 202 are disposed in a remote unit.

The active mitigation subsystem 200 can include can include anti-aliasing filter 320, analog-to-digital converter 322, digital IF filter 324, digital-to-analog converter 326, analog filter 328, local oscillator 332, mixer 330, power amplifier 334, and uplink gain adjust device 336 in the uplink communication path 204. Antenna 108 can recover uplink signals from a mobile user device 106 and provide uplink signals to anti-aliasing filter 320. Anti-aliasing filter 320 can reject signal components of bandwidths greater than one-half the sampling frequency of analog-to-digital converter 322, as well as frequencies within one or more adjacent Nyquist zones, to reduce aliasing from converting the uplink signal from analog to digital. In some aspects, anti-aliasing filter 320 can be a surface acoustic wave ("SAW") filter. Analog-to-digital converter 322 can convert the analog uplink signal to a digital uplink signal that can be transmitted over a serial link from a remote unit to a master unit. In some aspects, analog-to-digital converter 322 can be a very high dynamic range analog-to-digital converter. Analog-to-digital converter 322, similar to analog-to-digital converter 304, can include sample rates and input bandwidths sufficient to directly sample incoming RF signals received by antenna 108. Use of a very high dynamic range analog-to-digital converter bypasses the need for down-conversion of an uplink signal in uplink communication path 204 prior to analog-to-digital converter 322 converting the downlink signal to a digital downlink signal.

Digital IF filter 324 can further limit the bandwidth of the uplink signal. Digital-to-analog converter 326 can convert the uplink digital signal to an analog signal. Analog filter 328 can filter the signal to prevent aliasing that can result from converting the digital signals to analog. Local oscillator 332 and mixer 330 can up-convert the uplink signal to RF for transmission to the base station 102. Power amplifier 334 can amplify the uplink signal prior to transmission to base station 102. Uplink gain adjust device 336 can compensate for transmitter noise on the uplink signal. For example, uplink gain adjust device 336 can increase the uplink signal gain to ensure that the signal-to-noise ratio of the uplink signal does not decrease below an acceptable threshold. The uplink signal from gain adjust device 336 can be provided to the base station 102.

In some aspects, some components positioned in the uplink communication path 204 are disposed in a master unit and other components of uplink communication path 204 are disposed in a remote unit. The components disposed in a remote unit can include anti-aliasing filter 320 and analog-to-digital converter 322. The components disposed in a master unit can include digital IF filter 324, digital-to-analog converter 326, analog filter 328, mixer 330, local oscillator 332, power amplifier 334, and uplink gain adjust device 336. Analog-to-digital converter 322 can be serially coupled to digital IF filter 324. Although FIG. 3 depicts the uplink communication path 204 providing signals directly to the base station 102, an uplink communication path 204 can provide signals to a base station 102 via one or more intermediate components or devices. For example, the uplink communication path 204 can provide signals to a base station 102 via a master unit when all components of an uplink communication path 204 are disposed in a remote unit. In some aspects, the uplink communication path 204 can include a digital summer in a master unit. The digital summer can be communicatively coupled to the output of digital IF filter 324. The digital summer can sum uplink signals from various remote units before providing the uplink signals to the base station 102.

The use of very high dynamic analog-to-digital converters (e.g., analog-to-digital converters 304, 322) in the active mitigation subsystem 200 can allow for power combiner 300 or any other coupling device having little inherent isolation to directly couple downlink communication path 202 and uplink communication path 204 to antenna 108. The spurious responses due to down-conversion are no longer present as the analog-to-digital converters can obviate the need for down-conversion of the signals. This prevents a number of issues normally addressed by duplexers or other coupling devices having higher isolation properties. For example, obviating a need for down-conversion can: prevent damage of receiver input stages, prevent signals generated in a transmitter that can fall at other frequencies at which a receiver would be susceptible if a receive down-converter were present (e.g., images, mixed spurious products, etc.)

from interfering with the desired signal, prevent the creation of spurious receiver responses from strong transmit signals which may enter the receiver, which would otherwise be created if a receive down-converter were present (e.g., due to intermodulation), and prevent clipping of the analog-to-digital converter in the uplink communication path in the case where the transmitter and receiver use overlapping frequency bands (e.g., a time division duplex).

Figure 4:
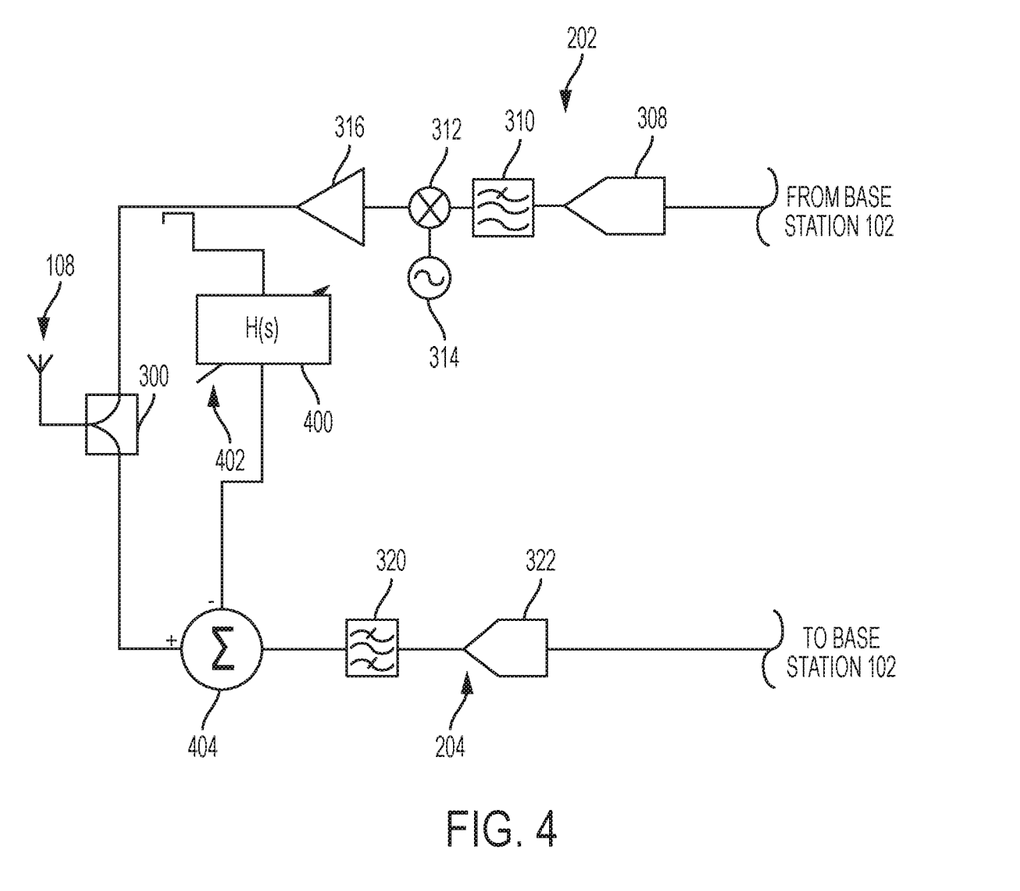
FIG. 4 is a schematic view of a system including a configurable analog filter for active analog mitigation according to one aspect.

FIG. 4 schematically depicts active analog mitigation circuitry of the active mitigation subsystem 200 positioned in uplink communication path 204. The uplink communication path 204 can include active analog mitigation circuitry including a configurable analog filter 400 in a reference path 402 and an analog summer 404 that receives a downlink mitigation signal from the configurable analog filter 400. Reference path 402 can include a path from a coupled point at the output of power amplifier 316 to an input of the analog summer 404. A downlink reference signal from the output of power amplifier 316 can traverse reference path 402.

Configurable analog filter 400 can be positioned in the reference path 402 and communicatively coupled to power amplifier 316 to receive the downlink reference signal. Configurable analog filter 400 can generate a downlink mitigation signal from the downlink reference signal by adjusting the gain and shifting the phase of the downlink reference signal. The downlink mitigation signal can be equal in amplitude to, and 180 degrees out of phase with, undesirable signal components generated in downlink communication path 202 and recovered by antenna 108.

Analog summer 404 can be positioned in the uplink communication path 204. The output of configurable analog filter 400 can be communicatively coupled to one of the inputs of analog summer 404. Another input of analog summer 404 can be communicatively coupled to antenna 108. Analog summer 404 can receive the downlink mitigation signal from the configurable analog filter 400 and sum the downlink mitigation signal with the uplink signal to mitigate any undesirable signal components present in the uplink signal. Mitigating undesirable signal components can include, for example, cancelling the undesirable downlink signal components present in the uplink signal. Analog summer 404 can provide the uplink signal to anti-aliasing filter 320. The uplink signal can traverse the remainder of uplink communication path 204 as depicted in FIG. 3.

The frequency response of configurable analog filter 400 can be set at set-up of the DAS 100 using a test signal. For example, the test signal can be transmitted by antenna 108 and any signal detected on uplink communication path 204 can be identified as the undesirable signal component generated by the transmission of the test downlink signal. The frequency response of configurable analog filter 400 can then be adjusted via electronic or manual processes to generate a downlink mitigation signal equal in amplitude to and 180 degrees out of phase with the undesirable signal component. In some aspects, configurable analog filter 400 can include an analog vector modulator capable of adjusting the phase and gain of the downlink mitigation signal.

In some aspects, configurable analog filter 400 can include an adaptive filter. The adaptive filter can be dynamically optimized by a microprocessor utilizing an iterative adaptation algorithm. The inputs to the iterative adaptation algorithm can be a downlink reference signal (e.g. the output signal from power amplifier 316) and an error signal (e.g. the output signal from analog summer 404). The microprocessor can apply the iterative adaptation algorithm to optimize the frequency response of configurable analog filter 400. Configurable analog filter 400, applying an optimized frequency response, can generate a downlink mitigation signal correlated with the undesirable signal component from downlink communication path 202. In some aspects, the iterative adaptation algorithm can be a least mean square algorithm.

Figure 5:
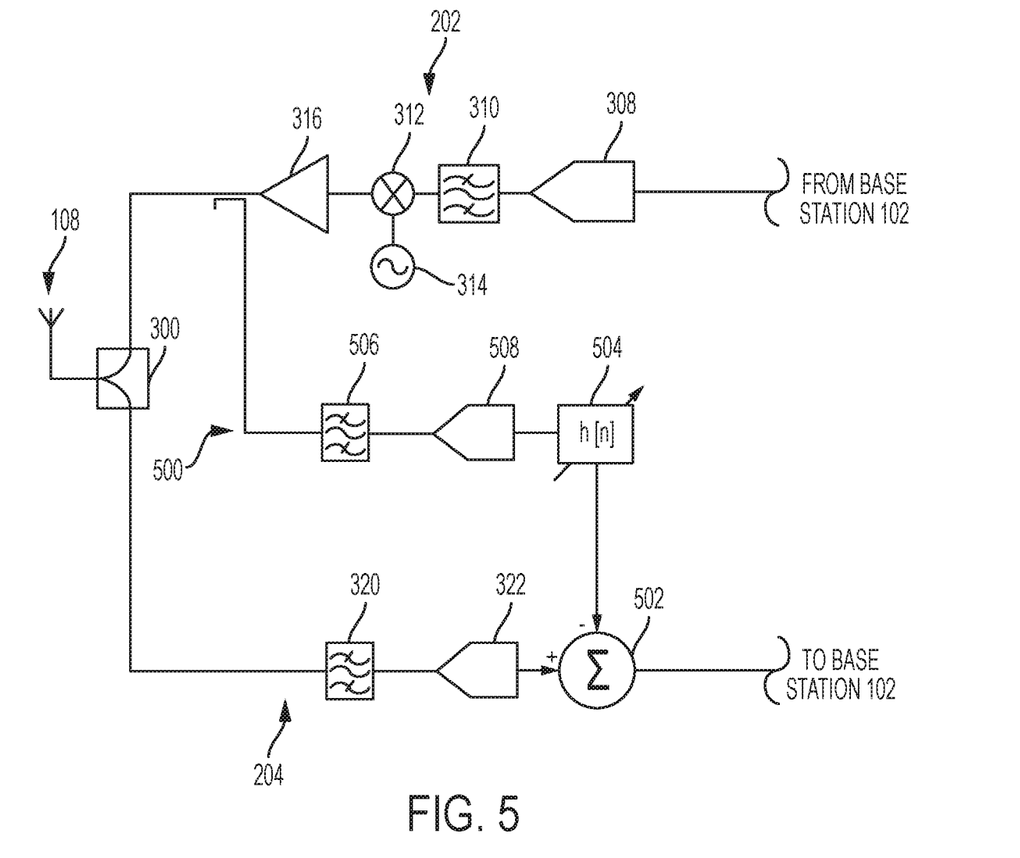
FIG. 5 is a schematic view of a system including a configurable digital filter for active digital mitigation according to one aspect.

FIG. 5 depicts active digital mitigation circuitry that can be included in the active mitigation subsystem 200. The circuitry is positioned in the downlink communication path 202, the uplink communication path 204, and a reference path 500. The active digital mitigation circuitry can include a digital summer 502 that receives a downlink mitigation signal from a configurable digital filter 504 in reference path 500.

FIG. 5 schematically depicts the components that can be included in uplink communication path 204 and the corresponding components that can be included in reference path 500 in addition to configurable digital filter 504. Reference path 500 can include an analog IF filter 506 and an analog-to-digital converter 508. A downlink signal can traverse the downlink communication path 202 as depicted in FIG. 4. The reference path 500 can be a path from the output of power amplifier 316 to one of the inputs of digital summer 502. Power amplifier 316 can provide a downlink reference signal to configurable digital filter 504 via reference path 500. Analog IF filter 506 and analog-to-digital converter 508 can process the downlink reference signal in the same manner as their corresponding components along a parallel section of uplink communication path 204 that process the uplink signal. In some aspects, analog-to-digital converter 508 can be a very high dynamic range analog-to-digital converter. Analog-to-digital converter 508, similar to analog-to-digital converters 322, can include sample rates and input bandwidths sufficient to directly sample incoming RF reference downlink signals received from the output of power amplifier 316. Use of a very high dynamic range analog-to-digital converter bypasses the need for down-conversion of a reference downlink signal in reference path 500 prior to analog-to-digital converter 508 converting the reference downlink signal to a digital reference downlink signal.

Configurable digital filter 504 can be positioned in the reference path 500. Configurable digital filter 504 can receive a downlink reference signal from analog-to-digital converter 508 and generate a downlink mitigation signal. To generate the downlink mitigation signal, configurable digital filter 504 can adjust the gain and phase of the downlink reference signal. The downlink mitigation signal can be equal in amplitude to and phase shifted 180 degrees from any undesirable signal component generated on downlink communication path 202 and recovered by antenna 108.

Digital summer 502 can be positioned in the uplink communication path 204. The output of configurable digital filter 504 can be communicatively coupled to one of the inputs of digital summer 502. Another input of digital summer 502 can be communicatively coupled to the output of analog-to-digital converter 322. Digital summer 502 can receive a downlink mitigation signal from configurable digital filter 504 and a digital uplink signal from analog-to-digital converter 322. Digital summer 502 can sum the downlink mitigation signal with the uplink signal to mitigate any undesirable signal components present in the uplink signal. In some aspects, digital summer 502 can provide the uplink signal to digital-to-analog converter 326. The uplink signal can traverse the remainder of uplink communication path 204 as described in FIG. 3.

Figure 6:
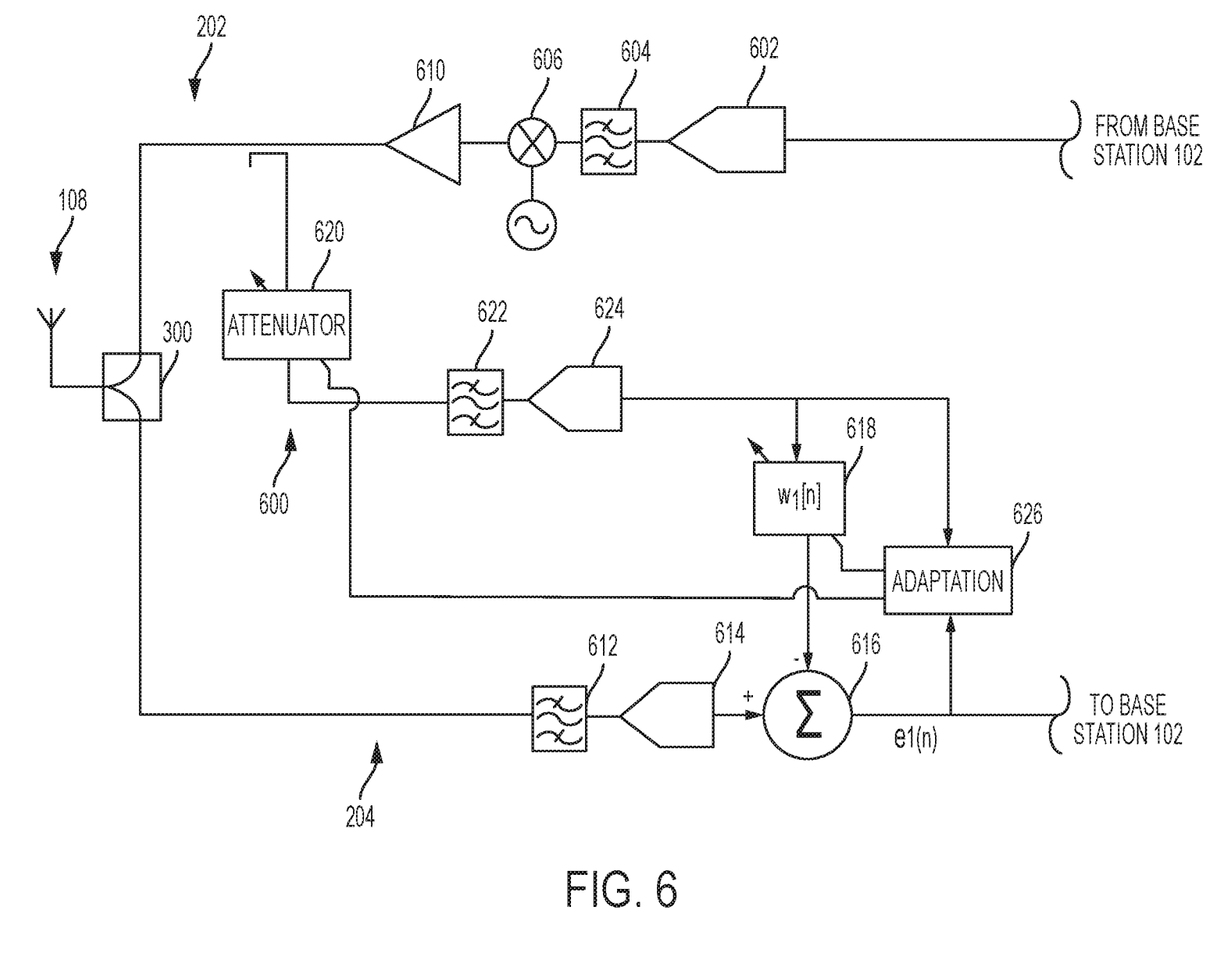
FIG. 6 is a schematic view of a system including a configurable digital filter and additional active mitigation circuitry according to one aspect.
Figure 7:
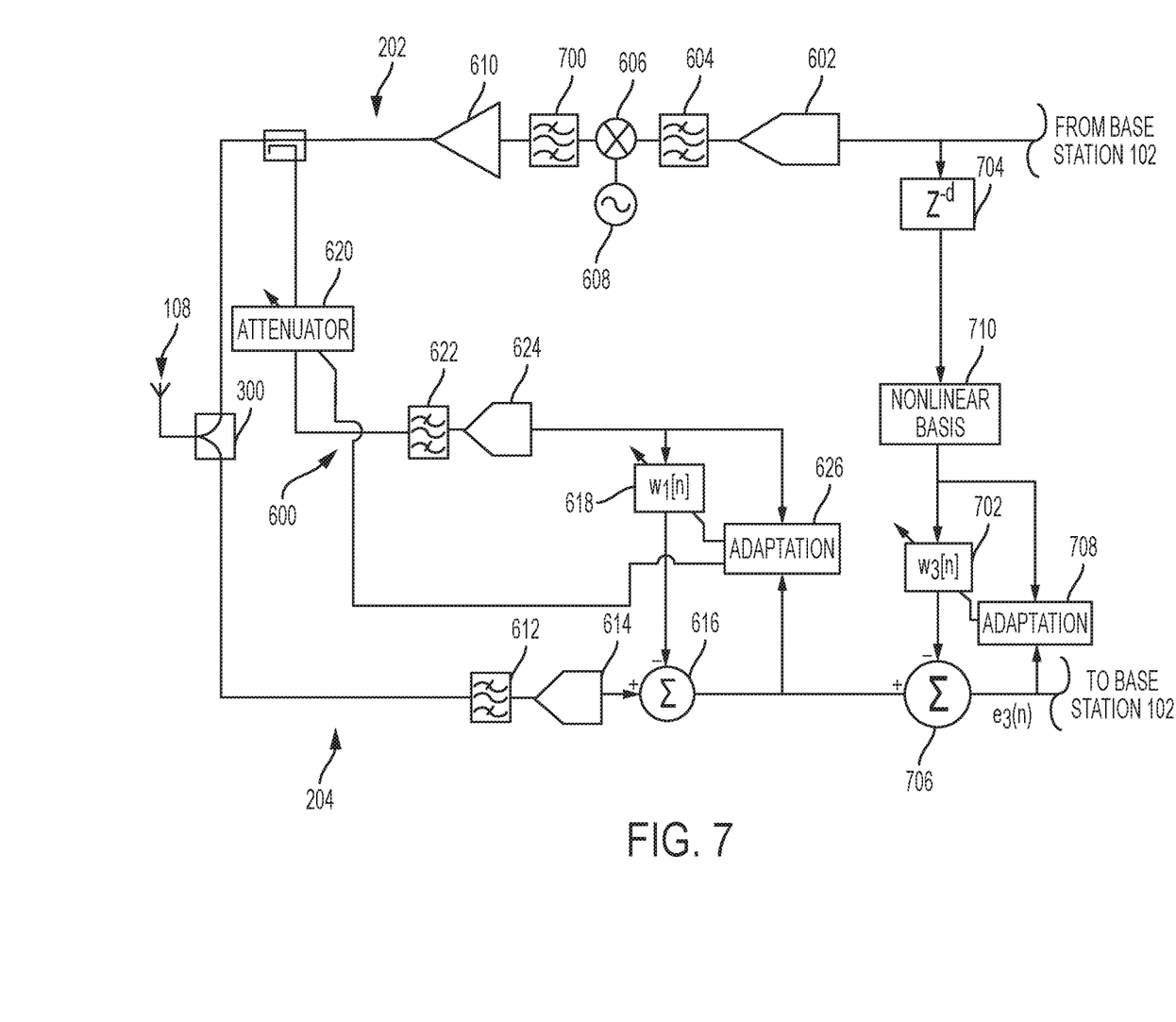
FIG. 7 is a schematic view of a system including two configurable digital filters for active digital mitigation according to one aspect.
Figure 8:
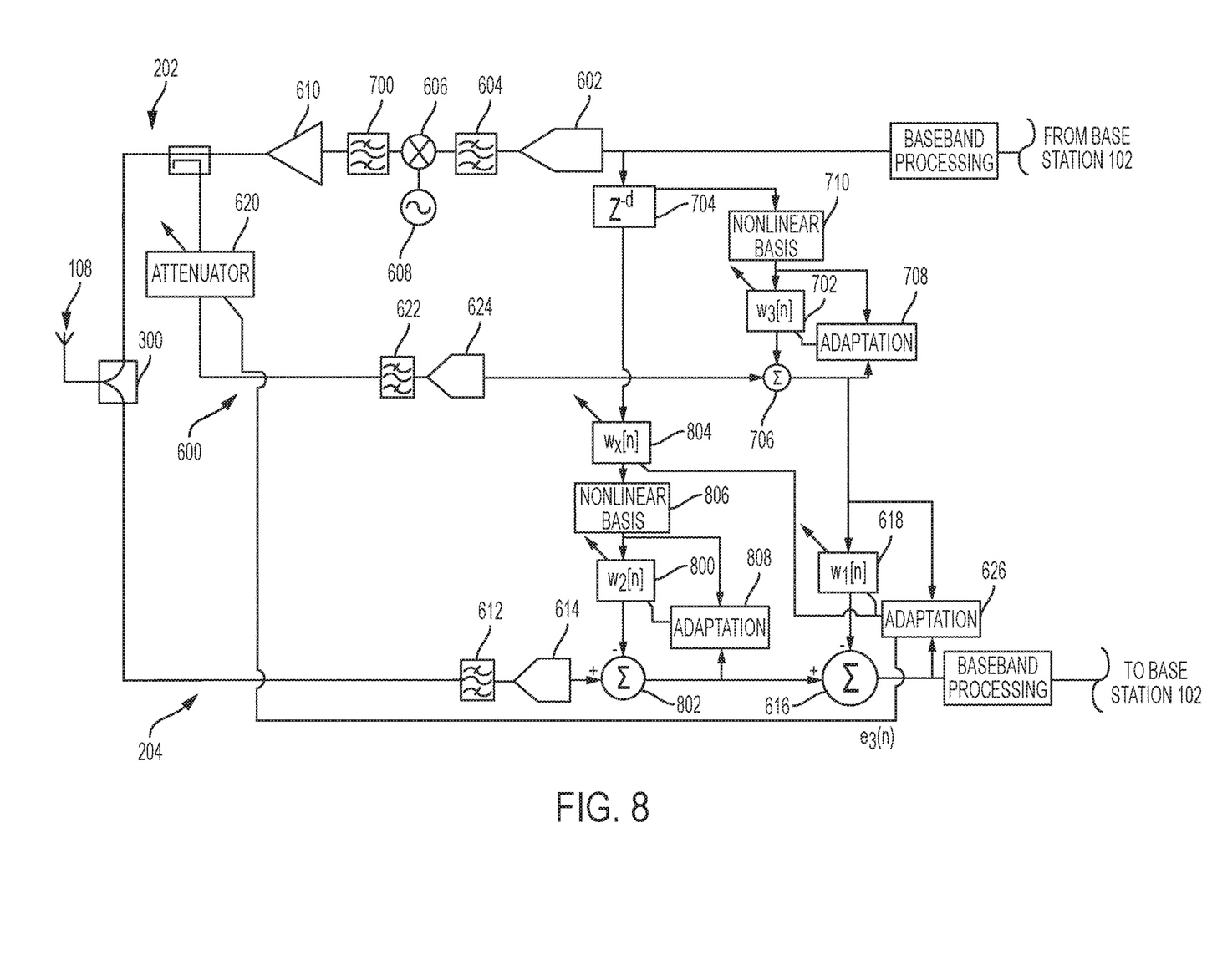
FIG. 8 is a schematic view of a system including three configurable digital filters for active digital mitigation according to one aspect.

In some aspects, the active mitigation subsystem 200 can include one or more devices for optimizing the frequency response of a configurable digital filter, as depicted in FIGS. 6-8. Optimizing the frequency response can allow the configurable digital filter to dynamically generate an accurate downlink mitigation signal corresponding to an undesirable signal component. FIG. 6 shows downlink communication path 202, uplink communication path 204, reference path 600, and antenna 108. Downlink communication path 202 can include digital-to-analog converter 602, analog filter 604, mixer 606, local oscillator 608, and power amplifier 610. Digital-to-analog converter 602 can convert digital downlink signals to analog signals. In some aspects, the digital downlink signals can be received from an analog-to-digital converter and digital IF filter (e.g., analog-to-digital converter 304 and digital IF filter shown in FIG. 3). Analog filter 604 can remove any aliases resulting from converting the digital downlink signals to analog signals. Mixer 606 and local oscillator 608 can up-convert downlink signals to RF. Power amplifier 610 can amplify the downlink signal to the output power for transmission.

Uplink communication path 204 can include anti-aliasing filter 612, analog-to-digital converter 614, and digital summer 616. Anti-aliasing filter 612 can reject signal components at bandwidths greater than one-half the sampling frequency of analog-to-digital converter 614, as well as frequencies within one or more adjacent Nyquist zones, to reduce aliasing from converting the uplink signal from analog to digital. Analog-to-digital converter 614 can convert the analog uplink signal to a digital uplink signal. In some aspects, analog-to-digital converter 614 can be a very high dynamic range analog-to-digital converter. Analog-to-digital converter 614 can include sample rates and input bandwidths sufficient to directly sample incoming RF uplink signals received from antenna 108. Use of a very high dynamic range analog-to-digital converter bypasses the need for down-conversion of an uplink signal in uplink communication path 204 prior to analog-to-digital converter 614 converting the uplink signal to a digital uplink signal.

Digital summer 616 can sum the downlink mitigation signal from configurable digital filter 618 with the uplink signal from analog-to-digital converter 614. Reference path 600 can include attenuator 620, anti-aliasing filter 622, analog-to-digital converter 624, and configurable digital filter 618. As depicted in FIG. 6, a downlink reference signal traversing reference path 600 can be used to generate the downlink mitigation signal. Attenuator 620 can attenuate the downlink reference signal such that the downlink reference signal power at the input to anti-aliasing filter 622 is equal to the power of any undesirable signals recovered by antenna 108 at the input to anti-aliasing filter 612. Equalizing the power of the downlink reference signal and the undesirable signals recovered by antenna 108 can ensure that the mitigation signal generated by configurable digital filter 618 can mitigate non-linear distortion signals on uplink communication path 204.

Attenuator 620 can attenuate the power of the downlink reference signal such that the ratio between the undesirable signal power and the non-linear distortion signal power on uplink communication path 204 is equal to the ratio between the downlink reference signal power and the non-linear distortion signal power on reference path 600. When these ratios are equal, the mitigation signal generated from the reference signal can mitigate both the undesirable signals and the non-linear distortion signal components on uplink communication path 204. The attenuation provided by attenuator 620 can be dynamically adjusted using a microprocessor using adaptation algorithm 626.

Anti-aliasing filter 622 can reject signal components with bandwidths greater than one-half the sampling frequency of analog-to-digital converter 624, as well as frequencies within one or more adjacent Nyquist zones, to reduce aliasing from converting the downlink reference signal from analog to digital. Analog-to-digital converter 624 can convert the analog downlink reference signal to digital.

Configurable digital filter 618 can modify the downlink reference signal to generate the downlink mitigation signal as described above with respect to configurable digital filter 504 shown in FIG. 5. The downlink mitigation signal can remove undesirable signals generated in downlink communication path 202 from the uplink signal. Digital summer 616 can sum the downlink mitigation signal with the uplink signal. An output ($e_1(n)$) of digital summer 616 can be the uplink signal after mitigating undesirable signal components.

A microprocessor using adaptation algorithm 626 can iteratively adjust frequency response $w_1[n]$ of configurable digital filter 618 and the attenuation provided by attenuator 620 in response to $e_1(n)$ and the downlink reference signal. Adaptation algorithm 626 can receive $e_1(n)$ and the downlink reference signal as inputs. Iteratively adjusting the frequency response of configurable digital filter 618 can allow configurable digital filter 618 to generate a downlink mitigation signal dynamically in response to the transmission of a downlink signal. Iteratively adjusting the attenuation provided by attenuator 620 can allow attenuator 620 to equalize the signal power of the downlink reference signal and the undesirable signals recovered by antenna 108.

FIG. 7 depicts additional circuitry to remove additional nonlinear distortion from uplink signals following active digital mitigation. Additional nonlinear distortion can result from downlink noise components generated by downlink analog signal processing components in downlink communication path 202. The downlink analog signal processing components can include analog filter 604, mixer 606, local oscillator 608, image reject filter 700, and power amplifier 610. Image reject filter 700 can reject or attenuate any output signal from mixer 606 at an image frequency of the desired downlink frequency. Power amplifier 610 can amplify the downlink signal to an output power for transmission.

Both the uplink signal and the downlink reference signal can include the downlink noise components at the inputs to the frequency conversion circuitry in uplink communication path 204 and reference path 600. Frequency conversion circuitry can include anti-aliasing filters 612, 622, and analog-to-digital converters 614, 624. Frequency conversion circuitry in the respective signal paths can create additional nonlinear distortion signals in uplink communication path 204 and reference path 600 by processing downlink noise components in each signal path.

The randomized (e.g., non-periodic) nature of the downlink noise components can cause randomized additional nonlinear distortion signals. Phase-shifting the additional nonlinear distortion signal traversing reference path 600 may not create a mitigation signal that can mitigate the additional nonlinear distortion signal traversing uplink communication path 204. Instead, digital summer 616 can sum the additional nonlinear distortion signals traversing uplink communication path 204 and reference path 600. The output of digital summer 616 can be an uplink signal that includes the summed additional nonlinear distortion signals. To remove the summed additional nonlinear distortion signals from the uplink signal, configurable digital filter 702 can generate a nonlinear distortion mitigation signal to mitigate additional nonlinear distortion in uplink communication path 204. Digital summer 616 and configurable digital filter 618 can mitigate other undesirable signal components as described with reference to FIG. 6.

The input to digital-to-analog converter 602 can be used as a second reference signal. Time delay component 704 can time-delay the second reference signal. The delay can be equal to the propagation delay of the reference signal traversing reference path 600. The propagation delay can be equal to the delay introduced by the components of both downlink communication path 202 and reference path 600. Delaying the second reference signal can ensure that the second reference signal is in phase with the downlink reference signal traversing reference path 600. Non-linear transformation function 710 can generate a distorted reference signal from the output of time delay component 704. The distortion from non-linear transformation function 710 is proportional to the additional nonlinear distortion from the downlink analog signal processing components and the frequency conversion circuitry in uplink communication path 204 and reference path 600. Configurable digital filter 702 can generate a nonlinear distortion mitigation signal from the distorted reference signal. The nonlinear distortion mitigation signal can mitigate the summed additional nonlinear distortion signals from the output of digital summer 616 traversing uplink communication path 204. Digital summer 706 can sum the nonlinear distortion mitigation signal with the uplink signal. The output of digital summer 706 can be a modified uplink signal ($e_3(n)$).

A microprocessor having a computer readable medium on which an adaptation algorithm 708 is stored can iteratively adjust frequency response $w_3[n]$ of configurable digital filter 702 in response to $e_3(n)$ and the second reference signal. The inputs to adaptation algorithm 708 can be modified uplink signal $e_3(n)$ and the output of non-linear transformation function 710. Iteratively adjusting the frequency response $w_3[n]$ can allow configurable digital filter 702 to dynamically generate a mitigation signal that correlates substantially with the summed additional nonlinear distortion signals traversing uplink communication path 204.

FIG. 8 depicts additional circuitry for separately mitigating the additional nonlinear distortion signals traversing uplink communication path 204 and reference path 600. Configurable digital filter 702 and digital summer 706 can remove the additional nonlinear distortion signal traversing reference path 600. Configurable digital filter 800 can modify an additional reference signal to generate a reference mitigation signal. The reference mitigation signal can mitigate signal components at uplink frequencies in the downlink reference signal traversing the second reference path. Configurable digital filter 800 and digital summer 802 can remove the additional nonlinear distortion signal traversing uplink communication path 204.

Configurable digital filter 804 can modify the time-delayed reference signal from time delay component 704. Configurable digital filter 804 can attenuate the time-delayed reference signal such that the power of the time-delayed reference signal is equal to the power of the additional nonlinear distortion signal traversing uplink communication path 204. The output signal of configurable digital filter 804 can be the input to non-linear transformation function 806. The output signal of non-linear transformation function 806 can be the input to configurable digital filter 800. Configurable digital filter 800 can generate a distortion mitigation signal proportional to the additional nonlinear distortion signal traversing uplink communication path 204. The distortion mitigation signal can mitigate the additional nonlinear distortion signal traversing uplink communication path 204. Digital summer 802 can sum the distortion mitigation signal with the uplink signal to mitigate the additional nonlinear distortion signal traversing uplink communication path 204. The frequency response of configurable digital filter 800 can be optimized as depicted in FIG. 7.

Configurable digital filter 702 and digital summer 706 can mitigate the additional nonlinear distortion signal traversing reference path 600. Configurable digital filter 702 can generate a distortion mitigation signal proportional to the additional nonlinear distortion signal traversing reference path 600. The distortion mitigation signal can mitigate the additional nonlinear distortion signal traversing reference path 600. Digital summer 706 can sum the distortion mitigation signal with the downlink reference signal to mitigate the additional nonlinear distortion signal traversing reference path 600. The output of digital summer 706 can be a modified reference signal after mitigating the additional nonlinear distortion signal traversing reference path 600. The frequency response of configurable digital filter 702 can be optimized as described with reference to in FIG. 7.

Configurable digital filter 618 can generate a downlink mitigation signal from the modified reference signal. Digital summer 616 can sum the downlink mitigation signal with the uplink signal from digital summer 802. The output of digital summer 616 can be the uplink signal after mitigating both the undesirable downlink signal components and the additional nonlinear distortion signals traversing uplink communication path 204 and reference path 600.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

The invention claimed is:

1. A telecommunications system, comprising:
   an uplink communication path configured for communicatively coupling uplink signals from an antenna to a base station; and
   a downlink communication path configured for communicatively coupling downlink signals to the antenna from the base station, the uplink communication path and downlink path both being configured to communicatively couple to the antenna using a non-duplexer coupling device; and
   an active mitigation subsystem that includes one or more analog-to-digital converters in the uplink communication path and in the downlink communication path, the one or more analog-to-digital converters in the downlink communication path having a dynamic range and bandwidth sufficient to directly sample incoming RF signals from the base station, the one or more analog-to-digital converters in the uplink communication path having a dynamic range and bandwidth sufficient to directly sample incoming RF signals received by the antenna,
   wherein the active mitigation subsystem is configured to isolate the uplink signals traversing the uplink communication path from the downlink signals traversing the downlink communication path independent of using a duplexer.

2. The telecommunications system of claim 1, wherein the uplink communication path and the downlink communication path are coupled to the antenna by a power combiner, wherein the one or more analog-to-digital converters include a sample rate for sampling the signal prior to converting the signal from a radio frequency signal to an intermediate frequency signal.

3. The telecommunications system of claim 1, further comprising an electronically tuned filter positioned in the downlink communication path coupled to the downlink communication path for attenuating undesirable signals generated by a transmitter prior to a transmission of the downlink signals by the antenna,
    wherein the non-duplexer coupling device includes isolation properties that are insufficient to prevent a desensitization of a receiver from transmitted noise in a receive frequency band of the antenna.

4. The telecommunications system of claim 1, further comprising:
    an analog summer positioned in the uplink communication path, the analog summer being configured for isolating the uplink signals from the downlink signals by mitigating, based on a mitigation signal from an electronically configurable analog filter, the downlink signals traversing the uplink communication path.

5. The telecommunications system of claim 1, further comprising:
    a digital summer positioned in the uplink communication path, the digital summer being configured for isolating the uplink signals from the downlink signals by mitigating, based on a mitigation signal from a configurable digital filter, the downlink signals traversing the uplink communication path.

6. The telecommunications system of claim 1, further comprising:
    a reference communication path for communicatively coupling the downlink communication path to a digital summer positioned in the uplink communication path; and
        a configurable digital filter positioned in the reference communication path for providing a mitigation signal to the digital summer.

7. The telecommunications system of claim 6, further comprising a master unit and a remote unit, wherein the master unit includes at least one of the one or more analog-to-digital converters, wherein the remote unit includes the reference communication path and the configurable digital filter for isolating the uplink signals traversing the uplink communication path from the downlink signals traversing the downlink communication path.

8. The telecommunications system of claim 6, further comprising an attenuator in the reference communication path for attenuating a downlink reference signal traversing the reference communication path to a downlink reference signal power corresponding to a power of at least one of the uplink signals received by the antenna, wherein the configurable digital filter is coupled to a microprocessor for applying an algorithm to adjust a frequency response of the configurable digital filter based at least in part on an output signal from the attenuator.

9. The telecommunications system of claim 6, further comprising:
    a second digital summer positioned in the uplink communication path for mitigating nonlinear distortion signals traversing the uplink communication path;
    a second reference communication path for communicatively coupling the downlink communication path to the second digital summer; and
    a second configurable digital filter positioned in the second reference communication path, the second configurable digital filter configured to provide a second mitigation signal to the second digital summer for mitigating the nonlinear distortion signals.

10. The telecommunications system of claim 9, further comprising:
    a third digital summer positioned in the reference communication path;
    a third reference communication path for communicatively coupling a timedelay device positioned in the second reference communication path to the third digital summer; and
    a third configurable digital filter positioned in the third reference communication path to provide a third mitigation signal to the third digital summer for mitigating additional nonlinear distortion signals.

11. A method, comprising:
    coupling an antenna to an uplink communication path and a downlink communication path using a non-duplexer coupling device, the uplink communication path configured for communicatively coupling uplink signals from the antenna to a base station and the downlink communication path configured for communicatively coupling downlink signals to the antenna from the base station;
    converting downlink signals traversing the downlink communication path from analog signals to a digital signals using an analog-to-digital converter having a dynamic range and bandwidth sufficient to directly sample incoming RF signals from the base station; and
    isolating uplink signals traversing the uplink communication path from the downlink signals independent of using a duplexer.

12. The method of claim 11, wherein the non-duplexer coupling device includes a power combiner, wherein isolating the uplink signals from the downlink signals includes:
    generating first mitigation signals based on a sample of the downlink signals using a configurable filter positioned in a reference communication path coupled to the downlink communication path; and
    summing the first mitigation signals and the uplink signals to produce isolated uplink signals.

13. The method of claim 12, wherein isolating the uplink signals from the downlink signals further includes:
    generating second mitigation signals based on a digital sample of the downlink signals using a configurable digital filter positioned in a second reference communication path coupled to the downlink communication path; and
    summing the second mitigation signals and the isolated uplink signals to mitigate nonlinear distortions in the isolated uplink signals.

14. The method of claim 13, wherein isolating the uplink signals from the downlink signals further includes:
    generating third mitigation signals based on the digital sample using a second configurable digital filter positioned in a third reference communication path; and
    summing the third mitigation signals and the isolated uplink signals to mitigate additional nonlinear distortions in the isolated uplink signals.

* * * * *